United States Patent
Patron

(10) Patent No.: US 11,241,673 B2
(45) Date of Patent: Feb. 8, 2022

(54) PROCESS FOR THE HYDROCONVERSION OF HEAVY HYDROCARBON OILS WITH REDUCED HYDROGEN CONSUMPTION OPERATING AT FULL CONVERSION

(71) Applicant: Luigi Patron, Milan (IT)

(72) Inventor: Luigi Patron, Milan (IT)

(*) Notice: Subject to any disclaimer, the term of this patent is extended or adjusted under 35 U.S.C. 154(b) by 0 days.

(21) Appl. No.: 16/952,824

(22) Filed: Nov. 19, 2020

(65) Prior Publication Data
US 2021/0162375 A1    Jun. 3, 2021

(30) Foreign Application Priority Data
Dec. 3, 2019   (IT) .................. 102019000022842

(51) Int. Cl.
| | | |
|---|---|---|
| *B01J 23/28* | (2006.01) | |
| *B01D 3/10* | (2006.01) | |
| *C10G 45/04* | (2006.01) | |
| *C10G 45/46* | (2006.01) | |

(52) U.S. Cl.
CPC .............. *B01J 23/28* (2013.01); *B01D 3/10* (2013.01); *C10G 45/04* (2013.01); *C10G 45/46* (2013.01); *C10G 2300/1037* (2013.01)

(58) Field of Classification Search
CPC ...... B01J 8/228; B01J 23/28; B01J 2208/003; B01J 2219/00164; B01J 2219/00186; B01J 2219/00202; B01J 2219/00234; B01D 3/10; C10G 45/04; C10G 45/46; C10G 47/20; C10G 47/26; C10G 49/12; C10G 49/24; C10G 49/26; C10G 2300/1037

See application file for complete search history.

(56) References Cited

U.S. PATENT DOCUMENTS

| | | | |
|---|---|---|---|
| 6,270,654 B1 | 8/2001 | Colyar et al. | |
| 2014/0299515 A1* | 10/2014 | Weiss ..................... | C10C 3/023 208/390 |

FOREIGN PATENT DOCUMENTS

| | | |
|---|---|---|
| GB | 2 108 525 | 5/1983 |
| WO | 2017/021987 | 2/2017 |
| WO | 2018/025282 | 2/2018 |
| WO | 2018/235113 | 12/2018 |

OTHER PUBLICATIONS

Search Report and Written Opinion for IT10201900022842 dated Aug. 13, 2020, 11 pages.

* cited by examiner

*Primary Examiner* — Brian A McCaig
(74) *Attorney, Agent, or Firm* — Nixon & Vanderhye

(57) ABSTRACT

In the hydroconversion processes of heavy hydrocarbon oils, in which the hydrogen is introduced at the reactor base by bubbling, the low diffusion rate of hydrogen, from the gas phase to the reaction liquid, limits the degree of conversion. The process circumvents the obstacle of the limited amount of reactant hydrogen by using a slurry bubble column reactor which reduces the formation of light hydrocarbon products, and therefore the hydrogen required for the hydroconversion, allowing to operate at full conversion.

19 Claims, 1 Drawing Sheet

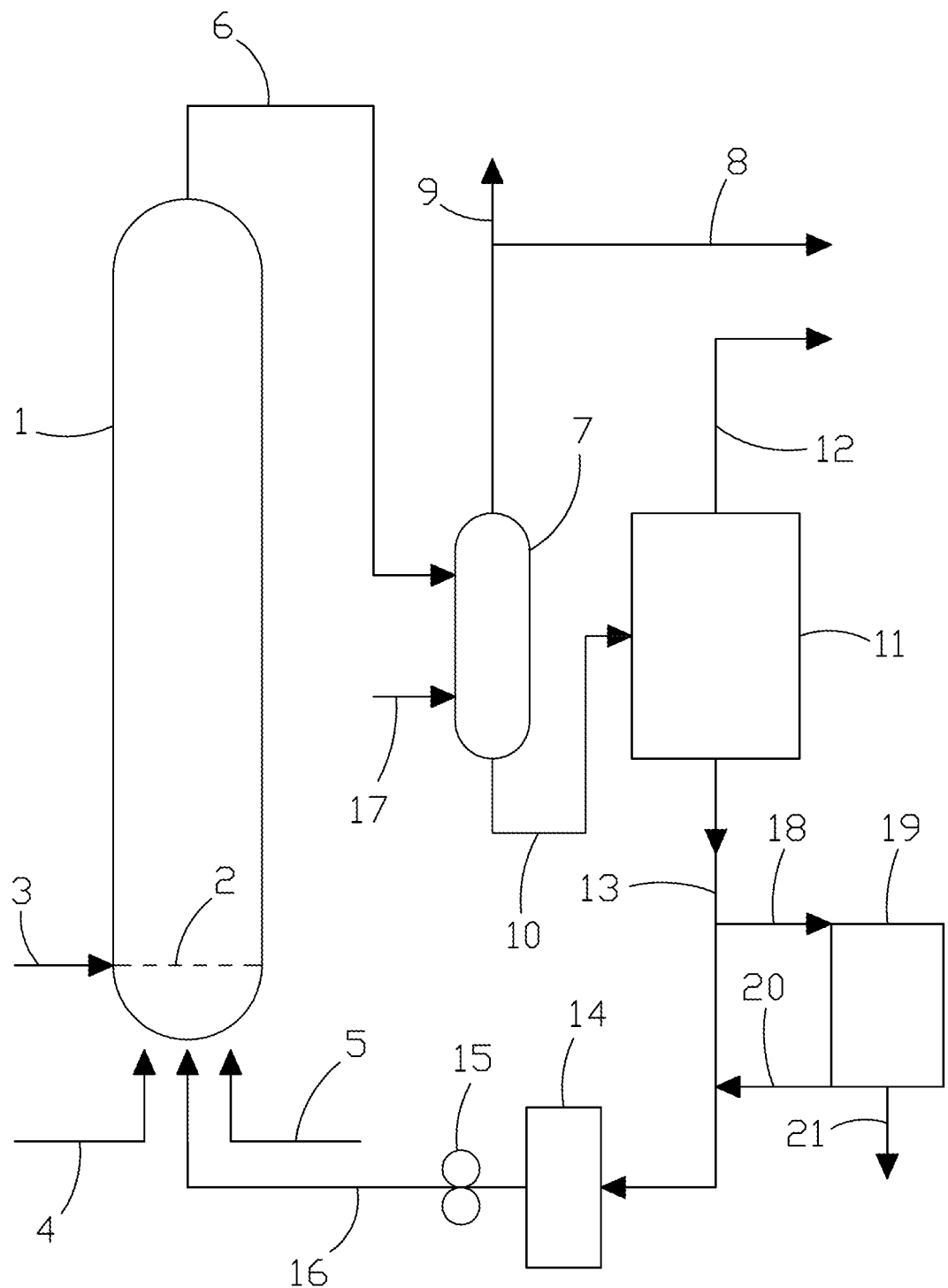

PROCESS FOR THE HYDROCONVERSION OF HEAVY HYDROCARBON OILS WITH REDUCED HYDROGEN CONSUMPTION OPERATING AT FULL CONVERSION

This application claims priority to IT Patent Application No. 102019000022842 filed Dec. 3, 2019, the entire contents of which are hereby incorporated by reference.

FIELD OF APPLICATION OF THE INVENTION

The present invention relates to a process for the hydroconversion of heavy hydrocarbon oils in a bubble column reactor, using a slurry type catalyst, combined with a distillation unit with final stage under vacuum for the extraction of the of high boiling conversion products.

REVIEW OF THE PRIOR ART

To increase the economic value of a heavy hydrocarbon oil, it is subjected to a hydroconversion treatment, which produces hydrogenation and cracking, to convert the heavy fraction of the oil into distillable hydrocarbons so that they can then be refined with conventional techniques into products suitable for the market.

A first type of hydroconversion processes of heavy hydrocarbon oils, which is commercially used since long time, is characterized by the use of a hydrogenation catalyst (comprising one or more transition metals) dispersed on an inorganic support, such as silica-alumina. Such a catalyst is referred to as a supported catalyst and the reactor is referred to as an expanded catalytic bed reactor or ebullated catalytic bed reactor, the catalyst being suspended in the reaction liquid by means of a circulation pump. The supported catalyst-type processes provide two or more hydroconversion reactors in series (stages), with the introduction of the hydrogen at the base and the extraction of the conversion products by evaporation directly at the reactor head. With this type of process, the conversion of a heavy oil is accompanied by the simultaneous production of an unconverted carbonaceous residue equal to about a quarter by weight of the treated feedstock, when this consists of vacuum residue. The conversion achieved with the hydroconversion treatment is therefore about 75%.

A second type of hydroconversion processes of heavy hydrocarbon oils, of more recent commercial application, uses a bubble column reactor and a hydrogenation catalyst finely dispersed in the reaction liquid, in a single reaction stage. Said reactor is also known as slurry bubble column reactor. Also in this case, the hydrogen is introduced at the base of the reactor. The extraction of the conversion products is completed by treating the reaction liquid, after separation of the gas phase, in a distillation unit having an under vacuum final stage, with the resulting unconverted vacuum residue and the catalyst dispersed therein being recycled to the reactor. Such a process is characterized by a conversion of the heavy oil considerably higher than the previous case, which however remains incomplete due to the need to remove a carbonaceous fraction generated, also in this case, by the hydroconversion process. The carbonaceous fraction is removed by purging a reaction liquid fraction equal to about one twentieth by weight of the treated feedstock, when this is a vacuum residue. The conversion achieved with the hydroconversion treatment is therefore about 95%.

The unconverted carbonaceous final residue of the hydroconversion systems using ebullated catalytic bed reactors and the purged reaction liquid of the hydroconversion systems using slurry bubble column reactors penalize the economic results and are by-products of increasingly difficult placement on the market, when not of problematic disposal, as a consequence of the progressive tightening of the environmental legislation.

OBJECT OF THE INVENTION

The hydroconversion of heavy hydrocarbon oils, both in supported catalyst systems and in slurry catalyst systems, is characterized by high hydrogen incorporation in the conversion products, and, for this reason, is accompanied by the formation of a carbonaceous residue which prevents the conversion completion. The object of the present invention is a hydroconversion process generating low hydrogen content products with reduced hydrogen consumption to operate at full conversion.

SUMMARY OF THE INVENTION

In the hydroconversion processes of heavy hydrocarbon oils, in which the hydrogen is introduced at the reactor base, the flow of hydrogen which diffuses from the gas phase into the liquid phase brings an amount of hydrogen to the reaction liquid insufficient to provide the hydrogen incorporated by the conversion products. For the part exceeding the amount coming from the gas phase, the hydrogen incorporated by the conversion products derives from the catalytic dehydrogenation of the hydrocarbons which constitute the reaction liquid. The catalytic dehydrogenation which is thus induced generates the carbonaceous residue which prevents the completion of the hydroconversion.

The process of the invention circumvents the obstacle consisting of the limited amount of hydrogen available from the gas phase by lowering the percentage of hydrogen incorporated in the conversion products.

The process preferably operates in a single reaction stage with the use of a bubble column reactor with a slurry-type catalyst (slurry bubble column reactor) combined, through a phase separator, with a distillation unit having an under vacuum final stage for extracting the high boiling conversion products. The vacuum residue and the catalyst dispersed therein being recycled into the reactor.

In order to lower the hydrogen incorporated in the conversion products, the production of light hydrocarbon is reduced by operating the reactor with a reaction liquid at low concentration of heavy gas oil and light gas oil, which have been found to be the main sources of the hydroconversion products having the higher hydrogen content: hydrocarbons $C_1$-$C_4$ and naphta.

Low concentrations of heavy gas oil and light gas oil in the reaction liquid are obtained accelerating the extraction of these two fractions, in the liquid state, by introducing vacuum residue to the reactor with a superficial velocity greater than that of the feedstock so as to carry these two fractions at higher capacity, through a phase separator, to the distillation section where the two fractions are finally extracted. In order to be able to feed the vacuum residue to the reactor at a flow rate such that the corresponding superficial velocity is greater than that of the feedstock, therefore at a flow rate ($m^3$/h) greater than the flow rate ($m^3$/h) of the feedstock which generates it, a reserve of vacuum residue is created downstream of the vacuum column by means of a special tank and a feeding compressor is inserted.

The reserve of vacuum residue is created by feeding the feedstock to the reactor at a greater flow rate with respect to the normal operating value and for the time required to produce an additional volume of vacuum residue to be collected in said tank at the outlet of the vacuum column.

A slurry bubble column reactor thus modified introduces the vacuum distillation residue at a superficial velocity greater than that of the feedstock when said vacuum residue is fed with a unit flow rate (given by the ratio of the flow rate, expressed in m³/h, with which said residue is fed, to the reactor section, expressed in m²) greater than Vs×H, where Vs is the hourly space velocity of the feedstock fed (given by the ratio of the flow rate, expressed in m³/h, with which the feedstock is fed, to the volume of the reactor, expressed in m³) and H is the height of the reactor expressed in meters. Incidentally, the unit flow rate and the product Vs×H both have the dimension of a velocity (mh$^{-1}$).

Once the hydrogen incorporated in the products has been lowered, in order for the conversion of a heavy hydrocarbon oil feedstock to be complete, the reactor is operated at a temperature such that the H/C ratio (i.e., the average number of hydrogen atoms for each carbon atom) in the T ° C.+ vacuum residue exiting the distillation unit is at least equal to the H/C ratio of the heavy fraction T ° C.+ present in the feedstock fed.

Further objects and advantages of the present invention will become clear from the detailed description which follows.

BRIEF DESCRIPTION OF THE FIGURE

The FIGURE, given merely by way of non-limiting explanation, diagrammatically shows a hydroconversion system which implements the process of the invention.

DETAILED DESCRIPTION OF SEVERAL PREFERRED EMBODIMENTS OF THE INVENTION

As used herein, heavy hydrocarbon oil is a hydrocarbon oil comprising a non-distillable fraction, even if subjected to vacuum distillation, which is referred to as heavy fraction. The heavy fraction, or residue, of a vacuum distillation of a heavy hydrocarbon oil, can have an initial boiling point at atmospheric pressure of, example, 525° C. or 540° C. or even 565° C., depending on the vacuum distillation conditions. Correspondingly, the heavy fraction or residue is indicated as 525° C.+, 540° C.+ or 565° C.+ heavy fraction or residue. More generally, a heavy fraction or residue having an initial boiling temperature of T ° C. at atmospheric pressure will be indicated as T ° C.+ heavy fraction or residue.

A heavy hydrocarbon oil, processable in accordance with the present invention, contains a percentage of heavy fraction such that the carbon residue which this entails, measured as % CCR (Conradson Carbon Residue, ASTM D-189), is at least 5%. Preferably the heavy hydrocarbon oil is a vacuum residue. Non-limiting examples of heavy hydrocarbon oils usable as described herein include crude oils, oils from tar sands, shell oils, atmospheric or vacuum residues of crude oils, visbroken tar, residues from solvent deasphalting of heavy hydrocarbon oils, oils from thermo-decomposition of organic material and mixtures thereof.

The hydrogen percentage in a 540° C.+ vacuum residue of a crude oil is indicatively between 9.5% and 10.5% depending on the origin of the crude oil. In relation to the hydrogen content, the carbon content (% CCR) of a residue 540° C.+ is close to 28% for 9.5% hydrogen content, while it is close to 13% when the hydrogen percentage of the residue 540° C.+ rises to 10.5%. Hydrogen percentages lower than 9.5% can be found, for example, on heat-treated oils (visbroken tar) or in asphaltene residues deriving from the solvent deasphalting of heavy oils.

The high carbon content, mainly due to the presence of asphaltenes, requires that the heavy fraction of an oil, or the oil itself, be submitted to hydroconversion in advance in order to then be transformed into valuable products for the market.

The hydroconversion of the heavy fraction involves a certain consumption of hydrogen, in part to hydrogenate unsaturated structures, such as asphaltenes, resins and aromatics (in addition to removing sulfur and nitrogen) and in part, the main part, to saturate the radicals generated by cracking. These amounts of hydrogen are incorporated into the conversion products.

In the multi stage hydroconversion systems, which use ebullated catalytic bed reactors, it is observed that in each reaction stage the H/C ratio of a heavy fraction of the reaction liquid, for example of the 540° C.+ fraction, is lower than the H/C ratio of the same heavy fraction (540° C.+) present in the corresponding liquid feeding. At the same time, there is also a decrease in the hydrogen percentage content.

Similarly, in the single stage and recycling hydroconversion systems, which use slurry bubble column reactors and a distillation unit, the H/C ratio in a heavy fraction of the reaction liquid or of the vacuum distillation residue, for example the 540° C.+ fraction, is lower than the H/C ratio of the same fraction (540° C.+) present in the feedstock fed. A similar reduction is found for the hydrogen percentage content.

For both cases cited, having the introduction of the hydrogen at the reactor base in common, the reduction of the H/C ratio of the heavy fractions along the process reveals that the amount of hydrogen incorporated in the conversion products is greater than the amount of hydrogen which, from the gas phase, by diffusion through the gas-liquid interface, can reach the reaction liquid to feed the hydroconversion. For the part exceeding the amount coming from the gas phase, the hydrogen incorporated in the conversion products comes from the catalytic dehydrogenation of the hydrocarbons constituting the reaction liquid.

Merely by way of example, taking molybdenum as the transition metal used as a catalyst, this acts as molybdenite S=Mo=S and as HS—Mo—SH in the form of molybdenite coordinated with hydrogen. The incorporation of hydrogen by the conversion products occurs mainly as a result of the saturation of the free radicals R* generated by cracking:

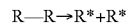

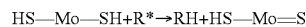

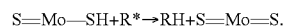

When the hydrogen from the gas phase is insufficient to restore the molybdenite in the form HS—Mo—SH, the hydrogen is provided by the hydrocarbons which constitute the reaction liquid, as a consequence of a catalytic dehydrogenation reaction:

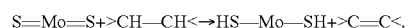

The catalytic dehydrogenation affects all the hydrocarbons constituting the reaction liquid. The catalytic dehydrogenation of the asphaltene component, i.e., of the component with the lowest H/C ratio, leads to hydrocarbons with even more limited hydrogen content, refractory to hydrogenation, becoming a source of carbonaceous residue to be disposed of. The catalytic dehydrogenation of the asphaltene component can continue to produce hydrocarbons which, due to the low hydrogen content, are solid and insoluble in toluene, usually referred to as coke. Carbonaceous products and coke accumulate in the reaction liquid, generating the carbonaceous fraction which is found in the unconverted final residue of the supported catalyst systems or in the purged reaction liquid in slurry catalyst systems.

In order to avoid the catalytic dehydrogenation of the reaction liquid, which is the prerequisite for operating with complete conversion, the hydroconversion must not require more hydrogen than it can diffuse from the gas phase. The hydrogen percentage incorporated in the conversion products must therefore be lowered. The first purpose of the present invention is how to lower the hydrogen incorporated in the conversion products.

As mentioned above, the hydroconversion treatment is aimed at allowing the heavy fraction of an oil, which will have a high carbon residue, high molecular weight and be rich in metals, as a result of such a treatment, to generate hydroconversion products from which to get finished products for the market.

The vacuum distillation residue of a heavy crude oil, for example the 540° C.+ residue, as already seen, has a hydrogen content indicatively between 9.5% and 10.5%, variable with the origin of the heavy oil. The hydroconversion treatment has the purpose of transforming one such a heavy fraction into hydrocarbons which must be practically free of carbon residue and metals, to be then refined with conventional techniques into commercial products. Such a quality is obtained when the hydrogen content reaches about 12%, a value at which the carbon residue (% CCR) is eliminated.

Typically, the set of hydroconversion products resulting from the treatment of an heavy oil, the so called product slate, instead has a weighted average hydrogen content which can reach and exceed 14%. This unnecessarily high product slate hydrogen content entails an amount of incorporated hydrogen which is thus double (from the median value 10% to 14% instead of 12%) than that strictly required to ensure the subsequent processability of the conversion products. The high hydrogen content of the product slate is the consequence of an excessive production of light hydrocarbons, primarily hydrocarbons $C_1$-$C_4$ and naphtha.

The hydroconversion treatment of a 540° C.+ residue produces a set of products conventionally grouped into four hydrocarbon fractions, as follows:

gas: hydrocarbons $C_1$-$C_4$;
naphtha: hydrocarbons $C_5$-boiling point hydrocarbons up to 221° C.;
light gas oil (atmospheric gas oil): fraction with boiling point 221° C.-343° C.;
heavy gas oil (vacuum gas oil): fraction with boiling point 343° C.-540° C.

Each of the above four fractions is generated both directly from the 540° C.+ residue and from each of the heavier fractions thereof. Taking into consideration the two fractions with the highest hydrogen content, namely the hydrocarbons $C_1$-$C_4$ and naphtha, these fractions are generated both directly from the 540° C.+ residue according to slow kinetics, and from the heavy gas oil and light gas oil fractions according to kinetics ten to one hundred times faster. The slower generation of the hydrocarbons $C_1$-$C_4$ and naphtha from residue 540° C.+ offers the possibility of reducing the production of these two fractions, having the highest hydrogen content, by limiting the concentration, in the reaction liquid, of the two fractions which generate them fastest: heavy gas oil and light gas oil, in the manner described below.

With reference to FIG. 1, a feedstock to be hydroconverted, consisting of a heavy hydrocarbon oil as previously defined, is fed through a line 4, to a vertical cylindrical reactor 1 of H meters in height with a flow rate which corresponds to an hourly space velocity Vs (expressed in $h^{-1}$ and given by the ratio of such a flow rate expressed in $m^3$/h to the volume of the reactor expressed in $m^3$).

Gas containing hydrogen is introduced into the reactor 1 with a line 3 and distributed at the base through the apparatus 2, comprising for example a perforated plate or a grid with nozzles or a series of circular-shaped tubes of increasing diameter, concentric and perforated. The bubbling fluid-dynamic regime which is thus generated ensures, even in the absence of mixing means, the required homogeneity of matter and uniformity of temperature inside the reactor 1. A hydroconversion slurry catalyst, comprising compounds of one or more transition metals (for example molybdenum, nickel, vanadium, iron, cobalt, tungsten and ruthenium), preferably oil-soluble, usually referred to as a precursor, is fed to the bottom of the reactor 1 by means of a line 5. The precursor, for example a compound of molybdenum, by reaction with the sulfur of the feedstock gives rise to the catalytically active species, in this case believed to be molybdenite S=Mo=S.

The reactor 1 operates at a pressure between 50 bar and 250 bar and at a temperature higher than 340° C.

A mixture comprising a gas phase and a liquid phase consisting of the reaction liquid, which is generated under the reaction conditions, exits at the head of the reactor 1 through a line 6. Such a mixture is introduced into a phase separator 7 at whose head the conversion products are recovered, in the gas and vapor state, by means of a line 8 and the unreacted hydrogen by means of a line 9. At the bottom of the separator 7 a liquid containing unconverted residue, heavy gas oil, light gas oil and, to a small extent, naphtha is collected. The hydrocarbons $C_1$-$C_4$ are found in the volatile fraction exiting the line 8. The catalyst in finely dispersed form is also present in the liquid at the bottom of the separator 7, which remains active, and the sulfides of the metals brought by the feedstock are present. After depressurization, the bottom liquid of the separator 7, by means of a line 10, is sent to a distillation unit 11 with a final stage under vacuum where the conversion products with the highest boiling point are recovered. The liquid exiting the distillation unit 11 by means of a line 13 constitutes the T ° C.+ vacuum residue having an initial boiling point at atmospheric pressure of T ° C., containing the catalyst, which is reintroduced in the reactor 1.

Consistently with what was previously specified, the vacuum residue fed as feedstock to be converted, or which is present in the heavy hydrocarbon oil fed to the system, is referred to as a "heavy fraction" to distinguish it from the vacuum residue of the line 13, produced by the distillation unit 11, which continues to be referred to as a "vacuum residue".

The hydrocarbons extracted from the distillation unit 11, exiting a line 12, added to the hydrocarbons exiting the head of the separator 7 by means of the line 8 give rise to the four hydrocarbon fractions indicated above which form the set of hydroconversion products (product slate), which is flanked by the inorganic by-products $H_2S$ and $NH_3$.

To reduce the production of light hydrocarbons, a reactor 1 is used in which the reaction liquid is kept at a low concentration of heavy gas oil and light gas oil since these two are the hydrocarbon fractions with the fastest generation of hydrocarbons $C_1$-$C_4$ and naphtha, as described above.

Low concentrations of heavy gas oil and light gas oil in the reaction liquid are obtained accelerating the extraction of such two fractions in the liquid state from the reactor 1. To this end, the vacuum residue exiting the line 13 is introduced at the base of the reactor 1 at a unit flow rate (given by the ratio of the flow rate, expressed in $m^3/h$, with which said residue is fed, to the reactor section expressed in $m^2$) such that the corresponding superficial velocity is greater than that of the fed feedstock. The vacuum residue, in passing from the bottom upwards in the reactor 1, mixes with liquid heavy gas oil and liquid light gas oil carrying them, with a capacity increasing with the superficial velocity, from the head of the reactor 1, through the phase separator 7, to the distillation unit 11, where such products are recovered, by distillation, to the line 12.

To operate with a vacuum residue superficial velocity greater than that of the feedstock, the vacuum residue is introduced at the base of the reactor 1 with a unit flow rate, as define above, greater than Vs×H, whatever it is the diameter of the reactor 1, where Vs ($h^{-1}$), as define above, is the hourly space velocity of the feedstock and H is the height of the reactor 1 expressed in meters. The unit flow rate of the vacuum residue, and the product Vs×H both have the dimension of a velocity ($mh^{-1}$). While the unit flow rate value gives the superficial velocity of the residue inside the reactor 1, the value of the product Vs×H gives the superficial velocity of the feedstock, inside the same reactor 1.

Operating with a vacuum residue unit flow rate introduced at the base of the reactor 1 even slightly greater than Vs×H, the production of hydrocarbons $C_1$-$C_4$ and naphtha is reduced in favor of heavy gas oil, whose percentage in the product slate thus exceeds 50% (when it is normally less than 40%).

Operating with a vacuum residue unit flow rate introduced at the base of the reactor 1 equal to twice Vs×H, the production of hydrocarbons $C_1$-$C_4$ and naphtha drops significantly, so that the heavy gas oil fraction, the fraction with the lowest hydrogen content in the product slate, becomes largely prevalent, with a consequent significant lowering of the hydrogen required by the hydroconversion.

Operating with a vacuum residue unit flow rate introduced at the base of the reactor 1 equal to six times Vs×H, or more, the concentration of heavy gas oil and the concentration of light gas oil in the reaction liquid reach the minimum values. Consequently, the minimum levels of hydrocarbon $C_1$-$C_4$ and naphtha in the product slate are observed (in this case, said hydrocarbons being generated practically by the vacuum residue only, at low speed). Correspondingly, the hydrogen consumed by the hydroconversion reaches the minimum value.

In order to introduce the vacuum residue from the distillation unit 11 at the base of the reactor 1 at a superficial velocity greater than that of the feedstock which generates it (therefore with a greater flow rate), a reserve of vacuum residue is created downstream of the vacuum column by means of a tank 14.

The reserve is created at start-up, or during the processing before activating an introduction of vacuum residue to the reactor 1 with a superficial velocity greater than that of the feedstock, feeding the feedstock to the reactor 1 at a greater flow rate than normal operation and for the time required to obtain an additional volume of residue from the distillation unit 11 which is collected in the tank 14. A compressor 15 withdraws from the tank 14 the vacuum residue to introduce it to the reactor 1 by means of a line 16 at a flow rate which can now be greater than that of the feedstock so that the reactor operates filled up with reaction mixture.

The reduction of the hydrogen incorporated in the products during the hydroconversion is the first required step which, however, may not be sufficient for the consumption of hydrogen to remain within the amount coming from the gas phase, so as to avoid the catalytic dehydrogenation of the reaction liquid. In order for this to occur, an additional condition is required, connected to the temperature of the reactor 1 as this, by determining the extent of thermal cracking, contributes to determining the hydrogen incorporated in the conversion products. The thermal cracking is reduced operating the reactor at a temperature not higher than 420° C.

In order for the hydroconversion of a heavy hydrocarbon oil feedstock to be complete (without the generation of carbon residue to be removed), the reactor 1 is operated at a temperature higher than 340° C. but such that in the T ° C.+ vacuum residue exiting the distillation unit 11, having an initial boiling temperature at atmospheric pressure of T ° C., the H/C ratio is at least equal to the H/C ratio of the heavy fraction T ° C.+ present in the feedstock to be converted.

In other words, in order for the hydroconversion to be complete, the reactor 1 is operated at a temperature such that the H/C ratio of the fraction T ° C.+ present in the vacuum residue is not lower than the H/C ratio in the feedstock when the latter corresponds to a heavy hydrocarbon oil consisting of a residue T ° C.+, or not lower than the H/C ratio in the fraction T ° C.+ of the feedstock when the latter corresponds to a heavy hydrocarbon oil comprising a residue T ° C.+.

The maximum temperature at which to operate the reactor 1 at complete conversion, since it depends on the gas-liquid specific surface characteristic of the reactor used, on the pressure at which the latter operates and on the percentage of hydrogen of the feedstock to be converted, etc., is identified with reactor running.

The flow rate of feedstock convertible by the system is that which keeps the liquid level in the tank 14 constant.

The removal of the metal sulfides which the same feedstock brings can be carried out by mechanically separating them from a flow of reaction liquid, preferably withdrawn from the line 13 by means of a line 18, with a flow rate not exceeding 1/10 of the flow rate of the feedstock fed to the system, exploiting the higher density of the metal sulfides with respect to the liquid, for example by means of cyclones or decanter(s), in a solids separation section 19. The liquid 20, deprived of the solids exiting the line 21, is recycled to reactor 1 by means of the line 13. The solids can be removed as a concentrated slurry or as solids, for example extruded. The amount of catalyst removed together with the metal sulfides is reintegrated in reaction by feeding, for example by means of the line 5, the corresponding amount of catalyst precursor.

The feedstock can be fed to the reactor 1 through the tank 14. In a different system configuration, the feedstock can be fed to the reactor 1 through the distillation unit 11. The latter configuration can be advantageous when the feedstock consists of extra heavy crude oil in an installation operatively separated from a refinery, i.e., for a so-called standalone system.

The use of a temperature in the reactor 1 allowing to leave in the T ° C.+ vacuum residue a H/C ratio greater than that of the T ° C.+ heavy fraction fed, therefore a greater hydrogen percentage content, is preferred because, even for limited increases in hydrogen content, there is a significant reduction in asphaltene fraction in the vacuum bottom liquid. This allows to obtain a better-quality vacuum distillate.

The reaction liquid, present in the liquid and gas mixture exiting the reactor 1 by means of the line 6, after separation of the gas phase and, consequently, also of the hydrogen, stays at the bottom of the separator 7 in high temperature and lack of hydrogen conditions, which can favor the catalytic dehydrogenation thereof. The subsequent treatment of the reaction liquid in the distillation unit 11, as a consequence of the low or zero partial pressure of the hydrogen, can also induce catalytic dehydrogenation. The catalytic dehydrogenation of the heavy asphaltene fraction of the reaction liquid which stays at the bottom of the separator 7 can be eliminated or, at least, limited by mixing such a liquid, by means of a line 17, with a maltenic hydrocarbon fraction, for example naphtha and/or light gas oil, preferably withdrawn from the same plant, in a proportion such that, in the resulting liquid mixture, the ratio of the percentage by weight of maltenes (hydrocarbon fraction soluble in n-heptane) to the percentage by weight of asphaltenes (hydrocarbon fraction insoluble in n-heptane) is greater than two.

The addition of maltenes to protect the asphaltene fraction from catalytic dehydrogenation can also be carried out in the distillation section 11.

Based on the description provided for a preferred embodiment, it is apparent that some changes can be introduced by those skilled in the art without departing from the scope of the invention as defined by the following claims.

The invention claimed is:

1. A process for the hydroconversion of heavy hydrocarbon oils, said process comprising the following steps:
   a) introducing at a lower portion of a reactor (1), of H meters in height:
   a heavy hydrocarbon oil feedstock consisting of, or comprising, a residue T ° C.+,
   "residue T ° C.+" meaning a vacuum residue having, at atmospheric pressure, the initial boiling point at T ° C.,
   said feedstock being introduced into said reactor (1) at a flow rate corresponding to an hourly space velocity Vs,
   "hourly space velocity Vs at which said feedstock is introduced into said reactor (1)" meaning the ratio of the flow rate, expressed in m³/h, at which said feedstock is introduced into said reactor (1), to the volume of said reactor (1), expressed in m³;
   a gas including hydrogen;
   an hydroconversion slurry catalyst comprising compounds of one or more transition metals,
   said reactor (1) operating at a temperature higher than 340° C. and at a pressure between 50 bars and 250 bars,
   a reaction mixture including a liquid phase, corresponding to a reaction liquid, and a gaseous phase generating in said reactor (1);
   b) withdrawing said reaction mixture from said reactor (1), at an upper portion thereof, and separating said gaseous phase from said liquid phase for recovering hydroconversion products, in the gas state and in the vapor state, and unreacted hydrogen, wherein,
   said separation of said gaseous phase from said liquid phase takes place by introducing said reaction mixture withdrawn from said reactor (1) into a phase separator (7),
   at least one maltenic hydrocarbon fraction being introduced into said phase separator (7) at a lower portion thereof, so as to be added to said liquid phase,
   "maltenic hydrocarbon fraction" meaning an hydrocarbon fraction soluble in n-heptane,
   said maltenic hydrocarbon fraction being introduced into said separator (7) at a flow rate such that in the liquid mixture resulting from the addition of said maltenic hydrocarbon fraction to said liquid phase, the ratio of the weight percentage of maltenes to the weight percentage of asphaltenes is greater than two;
   c) subjecting said liquid phase separated from said gaseous phase to distillation with final stage under vacuum, for extracting high boiling hydroconversion products;
   d) introducing into said reactor (1), at said lower portion, a vacuum residue of said final vacuum stage distillation,
   wherein:
   at step d), said vacuum residue is introduced into said reactor (1) at a unit flow rate greater than Vs×H,
   "unit flow rate at which said vacuum residue is introduced into said reactor (1)" meaning the ratio of the flow rate, expressed in m³/h, at which said vacuum residue is introduced into said reactor (1), to the section of said reactor (1), expressed in m².

2. The process according to claim 1, wherein, at step d), said vacuum residue is introduced into said reactor (1) at a unit flow rate not lower than twice Vs×H.

3. The process according to claim 2, wherein, at step d), said vacuum residue is introduced into said reactor (1) at a unit flow rate not lower than six times Vs×H.

4. The process according to claim 3, wherein, at step b), said separation of said gaseous phase from said liquid phase takes place by introducing said reaction mixture withdrawn from said reactor (1) into a phase separator (7),
   at least one maltenic hydrocarbon fraction being introduced into said phase separator (7) at a lower portion thereof, so as to be added to said liquid phase,
   "maltenic hydrocarbon fraction" meaning an hydrocarbon fraction soluble in n-heptane,
   said maltenic hydrocarbon fraction being introduced into said separator (7) at a flow rate such that in the liquid mixture resulting from the addition of said maltenic hydrocarbon fraction to said liquid phase, the ratio of the weight percentage of maltenes to the weight percentage of asphaltenes is greater than two.

5. The process according to claim 3, wherein a flow of reaction liquid with a flow rate not greater than ¹/₁₀ of the flow rate with which said feedstock is introduced into said reactor (1) is subjected to a treatment for mechanically separating the solids generated in the reaction due to the removal of the latter, with re-introduction of said flow of reaction liquid deprived of said solids into said reactor (1).

6. The process according to claim 3, wherein said catalyst is an oil-soluble molybdenum compound.

7. The process according to claim 2, wherein, at step b), said separation of said gaseous phase from said liquid phase takes place by introducing said reaction mixture withdrawn from said reactor (1) into a phase separator (7),
   at least one maltenic hydrocarbon fraction being introduced into said phase separator (7) at a lower portion thereof, so as to be added to said liquid phase,
   "maltenic hydrocarbon fraction" meaning an hydrocarbon fraction soluble in n-heptane,
   said maltenic hydrocarbon fraction being introduced into said separator (7) at a flow rate such that in the liquid mixture resulting from the addition of said maltenic hydrocarbon fraction to said liquid phase, the ratio of the weight percentage of maltenes to the weight percentage of asphaltenes is greater than two.

8. The process according to claim 2, wherein a flow of reaction liquid with a flow rate not greater than 1/10 of the flow rate with which said feedstock is introduced into said reactor (1) is subjected to a treatment for mechanically separating the solids generated in the reaction due to the removal of the latter, with re-introduction of said flow of reaction liquid deprived of said solids into said reactor (1).

9. The process according to claim 2, wherein said catalyst is an oil-soluble molybdenum compound.

10. The process according to claim 1, comprising operating said reactor (1) at a temperature at which the H/C ratio of the vacuum residue of said final vacuum stage is greater than the H/C ratio in said feedstock when the feedstock consists of the residue T ° C.+, or greater than the H/C ratio in the fraction of said feedstock corresponding to the residue T ° C.+ when the feedstock comprises the residue T ° C.+.

11. The process according to claim 10, wherein, at step b), said separation of said gaseous phase from said liquid phase takes place by introducing said reaction mixture withdrawn from said reactor (1) into a phase separator (7),
- at least one maltenic hydrocarbon fraction being introduced into said phase separator (7) at a lower portion thereof, so as to be added to said liquid phase, "maltenic hydrocarbon fraction" meaning an hydrocarbon fraction soluble in n-heptane,
- said maltenic hydrocarbon fraction being introduced into said separator (7) at a flow rate such that in the liquid mixture resulting from the addition of said maltenic hydrocarbon fraction to said liquid phase, the ratio of the weight percentage of maltenes to the weight percentage of asphaltenes is greater than two.

12. The process according to claim 10, wherein a flow of reaction liquid with a flow rate not greater than 1/10 of the flow rate with which said feedstock is introduced into said reactor (1) is subjected to a treatment for mechanically separating the solids generated in the reaction due to the removal of the latter, with re-introduction of said flow of reaction liquid deprived of said solids into said reactor (1).

13. The process according to claim 10, wherein said catalyst is an oil-soluble molybdenum compound.

14. The process according to claim 1, wherein a flow of reaction liquid with a flow rate not greater than 1/10 of the flow rate with which said feedstock is introduced into said reactor (1) is subjected to a treatment for mechanically separating the solids generated in the reaction due to the removal of the latter, with re-introduction of said flow of reaction liquid deprived of said solids into said reactor (1).

15. The process according to claim 14, wherein characterized in that said flow of reaction liquid is a flow of said vacuum residue before the latter is introduced into said reactor (1), at step d).

16. The process according to claim 14, wherein said catalyst is an oil-soluble molybdenum compound.

17. The process according to claim 1, wherein characterized in that said catalyst is an oil-soluble molybdenum compound.

18. The process according to claim 1, wherein a flow of reaction liquid with a flow rate not greater than 1/10 of the flow rate with which said feedstock is introduced into said reactor (1) is subjected to a treatment for mechanically separating the solids generated in the reaction due to the removal of the latter, with re-introduction of said flow of reaction liquid deprived of said solids into said reactor (1).

19. The process according to claim 14, wherein said catalyst is an oil-soluble molybdenum compound.

* * * * *